United States Patent
Ji et al.

(10) Patent No.: US 8,611,333 B2
(45) Date of Patent: Dec. 17, 2013

(54) SYSTEMS AND METHODS OF MOBILE RELAY MOBILITY IN ASYNCHRONOUS NETWORKS

(75) Inventors: Tingfang Ji, San Diego, CA (US); Dexu Lin, San Diego, CA (US); Wanshi Chen, San Diego, CA (US); Rajat Prakash, La Jolla, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 12/854,767

(22) Filed: Aug. 11, 2010

(65) Prior Publication Data
US 2011/0194407 A1 Aug. 11, 2011

Related U.S. Application Data

(60) Provisional application No. 61/233,268, filed on Aug. 12, 2009.

(51) Int. Cl.
| | | |
|---|---|---|
| H04B 7/14 | (2006.01) | |
| H04W 4/00 | (2009.01) | |
| H04W 36/00 | (2009.01) | |
| H04B 7/26 | (2006.01) | |
| H04W 84/04 | (2009.01) | |
| H04W 84/00 | (2009.01) | |
| H04W 36/16 | (2009.01) | |
| H04W 56/00 | (2009.01) | |

(52) U.S. Cl.
CPC ........... *H04B 7/2606* (2013.01); *H04W 84/045* (2013.01); *H04W 84/005* (2013.01); *H04W 36/16* (2013.01); *H04W 56/00* (2013.01)
USPC ............ 370/350; 370/315; 370/331; 455/436

(58) Field of Classification Search
USPC ......... 370/225, 226, 315, 328, 331–334, 350, 370/324; 455/422.1, 436–444
See application file for complete search history.

(56) References Cited

U.S. PATENT DOCUMENTS

| | | | |
|---|---|---|---|
| 2003/0050064 A1* | 3/2003 | Davies et al. | 455/441 |
| 2008/0107076 A1* | 5/2008 | Ramachandran et al. | 370/331 |

(Continued)

FOREIGN PATENT DOCUMENTS

| | | |
|---|---|---|
| JP | 2007104344 A | 4/2007 |
| TW | 200922238 A | 5/2009 |
| WO | 2007078138 A2 | 7/2007 |
| WO | 2007119168 A2 | 10/2007 |
| WO | 2008060021 A1 | 5/2008 |
| WO | 2008084394 A2 | 7/2008 |
| WO | 2008084943 A1 | 7/2008 |

OTHER PUBLICATIONS

Huawei: "Additional consideration for Type 1 Relay" 3GPP Draft; R3-091335, 3rd Generation Partnership Project (3GPP), Mobile Competence Centre; 650m Route Des Lucioles; F-06921 Sophia-Antipolis Cedex; France, San Francisco, USA; Apr. 29, 2009, XP050341671.

(Continued)

*Primary Examiner* — Paul H Masur
(74) *Attorney, Agent, or Firm* — Michael J. DeHaemer, Jr.

(57) ABSTRACT

A system and method of managing adjustment of synchronization timing for handover of a mobile relay is disclosed. The method includes repositioning coverage of the mobile relay from a first network access point to a second network access point and adjusting a synchronization timing of the mobile relay in an asynchronous network of the wireless communication system.

26 Claims, 9 Drawing Sheets

(56) References Cited

U.S. PATENT DOCUMENTS

2008/0220790 A1\* 9/2008 Cai et al. .................. 455/450
2009/0196244 A1   8/2009 Chun et al.
2010/0248619 A1\* 9/2010 Senarath et al. ........... 455/11.1
2011/0134887 A1\* 6/2011 Jeon et al. .................. 370/331

OTHER PUBLICATIONS

International Search Report and Written Opinion—PCT/US2010/045398—International Search Authority, European Patent Office, Jan. 26, 2011.

Partial International Search Report—PCT/US2010/045398, International Searching Authority—European Patent Office, Nov. 2, 2010.

Teyeb O., et al., "Dynamic Relaying in 3GPP LTE-Advanced Networks" EURASIP Journal on Wireless Communications and Networking, Hindawi Publishing Corporation, New York, NY, US, Jan. 1, 2009, pp. 1-11, XP002572643.

Teyeb O., et al., "Handover Framework for Relay Enhanced LTE Networks" Communications Workshops, 2009. ICC Workshops 2009. IEEE International Conference on, IEEE, Piscataway, NJ, USA, Jun. 14, 2009, pp. 1-5, XP031515443.

Taiwan Search Report—TW099126979—TIPO—Jun. 10, 2013.

Teyeb O., et al., "Dynamic Relaying in 3GPP LTE-Advanced Networks", EURASIP Journal on Wireless Communications and Networking—3GPP LTE and LTE Advanced, vol. 2009, Mar. 2009.

\* cited by examiner

SYSTEMS AND METHODS OF MOBILE RELAY MOBILITY IN ASYNCHRONOUS NETWORKS

CROSS-REFERENCE TO RELATED APPLICATIONS

This application claims the benefit of U.S. Provisional Application No. 61/233,268, filed Aug. 12, 2009, entitled "Systems and Methods of Mobile Relay Mobility In Asynchronous Networks" the contents of which are hereby incorporated by reference.

BACKGROUND OF THE INVENTION

1. Field of the Invention

The following description relates generally to wireless communication and, in particular, to using one or more mobile relays for such communication.

2. Relevant Background

Wireless communication systems are widely deployed to provide various types of communication content such as voice and data. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. Generally, a wireless multiple-access communication system can simultaneously support communication for multiple wireless devices.

In such systems, base stations are used to create coverage areas. A mobile device can establish a two-way link with a particular base station in its coverage area to transfer information between the base station and the mobile device. As the mobile device travels outside the coverage area of the particular base station, communication with the base station can breakdown. Typically, a handover can occur such that the mobile device transfers to a more suitable base station.

SUMMARY OF THE INVENTION

Various timing adjustment procedures to support handover of a mobile relay in an asynchronous network are disclosed herein. In an aspect, the coverage of a mobile relay is repositioned from a first network access point to a second network access point and the synchronization timing of the mobile relay is adjusted.

In another aspect, a mobile relay operates in a wireless communication system, and includes: (1) a processor for repositioning coverage of the mobile relay from a source base station to a target base station and for adjusting timing of the mobile relay in an asynchronous network of the wireless communication system; and (2) a memory coupled to the processor for storing data.

In a further aspect, a wireless network having a first network access point and one or more access terminals includes: (1) a mobile relay operable to wirelessly relay communications between the first network access point and the one or more access terminals, the mobile relay having a current synchronization timing associated with the first network access point; and (2) a second network access point that transmits a message indicating a different synchronization timing associated with the second network access point, the different synchronization timing being different from the current synchronization timing. The mobile relay adjusts the synchronization timing of the mobile relay in accordance with the different synchronization timing to transfer communications from between the first network access point and the one or more access terminals to between the second network access point and the one or more access terminals.

BRIEF DESCRIPTION OF THE DRAWINGS

The features, nature, and advantages of the present disclosure will become more apparent from the detailed description set forth below when taken in conjunction with the drawings. According to common practice, various features/elements of the drawings may not be drawn to scale. Common numerical references represent like features/elements. The following figures are included in the drawings.

DETAILED DESCRIPTION OF THE EMBODIMENTS

Although embodiments are illustrated and described herein, the embodiments are not intended to be limited to the details shown. Rather, various modifications may be made in the details within the scope and range of equivalents of the claims and without departing from the scope of the present disclosure.

Various exemplary embodiments enable timing adjustment for access terminals (e.g., mobile relays and/or user equipment (UE)) in asynchronous networks that have network access points (NAPs), e.g., base stations, which are not synchronized to facilitate handover operations from one NAP to another NAP.

Although various exemplary embodiments are described herein in terms of LTE systems, it is understood by one skilled in the art that the access terminals and timing adjustment procedures described herein may be applied to other communication networks such as CDMA networks, TDMA networks, FDMA networks, OFDMA networks and Single-Carrier FDMA (SC-FDMA) networks, among others. The terms "networks" and "systems" may be used interchangeably.

A CDMA network may implement a radio technology such as Universal Terrestrial Radio Access (UTRA) or cdma2000, among others. UTRA may include Wideband-CDMA (W-CDMA) or Low Chip Rate (LCR). cdma2000 may cover IS-2000, IS-95 or IS-856 standards. A TDMA network may implement a radio technology, such as Global System for Mobile Communications (GSM). An OFDMA network may implement a radio technology, such as Evolved UTRA (E-UTRA), IEEE 802.11, IEEE 802.16, IEEE 802.20 or Flash-OFDM®, among others. UTRA, E-UTRA, and GSM are part of Universal Mobile Telecommunication System (UMTS). LTE is an upcoming release of UMTS that uses E-UTRA. UTRA, E-UTRA, GSM, UMTS and LTE and are described in documents from an organization named "3rd Generation Partnership Project" (3GPP). cdma2000 is described in documents from an organization named "3rd Generation Partnership Project 2" (3GPP2). These various radio technologies and standards are known in the art. SC-FDMA systems use single carrier modulation and frequency domain equalization and have similar performance and essentially the same overall complexity as OFDMA system. A SC-FDMA signal may have a lower peak-to-average power ratio (PAPR) because of the single carrier structure of SC-FDMA. SC-FDMA is currently a working assumption for the uplink multiple access scheme in 3GPP LTE or E-UTRA because the lower PAPR may be advantageous for the access terminals in terms of transmit power efficiency.

Figure 1:
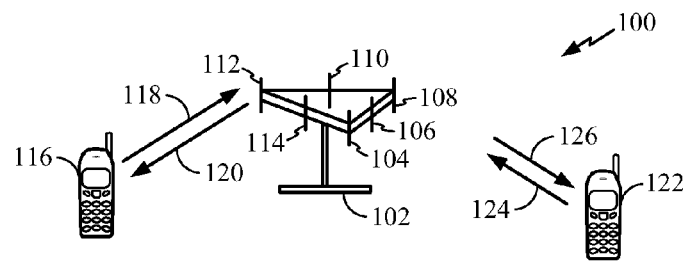
FIG. 1 is a diagram illustrating a multiple access wireless communication system.

FIG. 1 is a diagram illustrating a multiple access wireless communication system 100.

Referring now to FIG. 1, the multiple access wireless communication system 100 may include one or more network access points (NAP) 102 (e.g., base stations or other communication devices) in communication with one or more access terminals 116 and 122 (e.g., user equipment, mobile devices or other communication equipment, among others).

Each NAP 102 may provide coverage for a plurality of sectors. The NAP 102 may be a fixed station with a coverage area (e.g., a particular geographic region) and may communicate with the access terminals 116 and 122 in the coverage area. A three-sector NAP 102 is illustrated that includes multiple antenna groups (e.g., a first antenna group may include antennas 104 and 106, a second antenna group may include antennas 108 and 110, and a third antenna group may include antennas 112 and 114). A sector of a NAP generally refers to an area or geographic region associated with an antenna group. For example, the NAP 102 may communicate with the access terminal 122 via the first antenna group 104:106 in one of the sectors.

Although two antennas for each antenna group are shown, it is contemplated that more antennas or fewer antennas may be used for each antenna group. Although a three-sector NAP is shown, it is contemplated that more sectors or fewer sectors may be implemented by the NAP.

The access terminal 116 may communicate with the NAP 102 via the antennas 112 and 114 such that the antennas 112 and 114 transmit (or send) information to the access terminal 116 over a forward link 120 and receive information from the access terminal 116 over a reverse link 118. The forward link (or downlink) generally refers to a communication link from the NAP to the access terminals, and the reverse link (or uplink) generally refers to a communication link from the access terminals to the NAP. The access terminal 122 may communicate with the NAP 102 via the antennas 104 and 106 such that the antennas 104 and 106 transmit information to the access terminal 122 over a forward link 126 and receive information from the access terminal 122 over a reverse link 124. In a Frequency Division Duplex (FDD) system, the forward and reverse links 118, 120, 124 and 126 may use different frequencies for communication. In certain exemplary embodiments, the forward links 120 and 126 may use a different frequency (or frequency band) than the frequency (or frequency band) used by the reverse links 118 and 124.

In communication over the forward links 120 and 126, the antennas 104:106 and 112:114 of the NAP 102 may use beamforming to improve the signal-to-noise ratio of the forward links 120 and 126. By using beamforming from the NAP 102 for transmission to access terminals 116 and 122, a reduction in interference may be realized for access terminals in neighboring cells relative to a single antenna configuration for the NAP 102.

Figure 2:
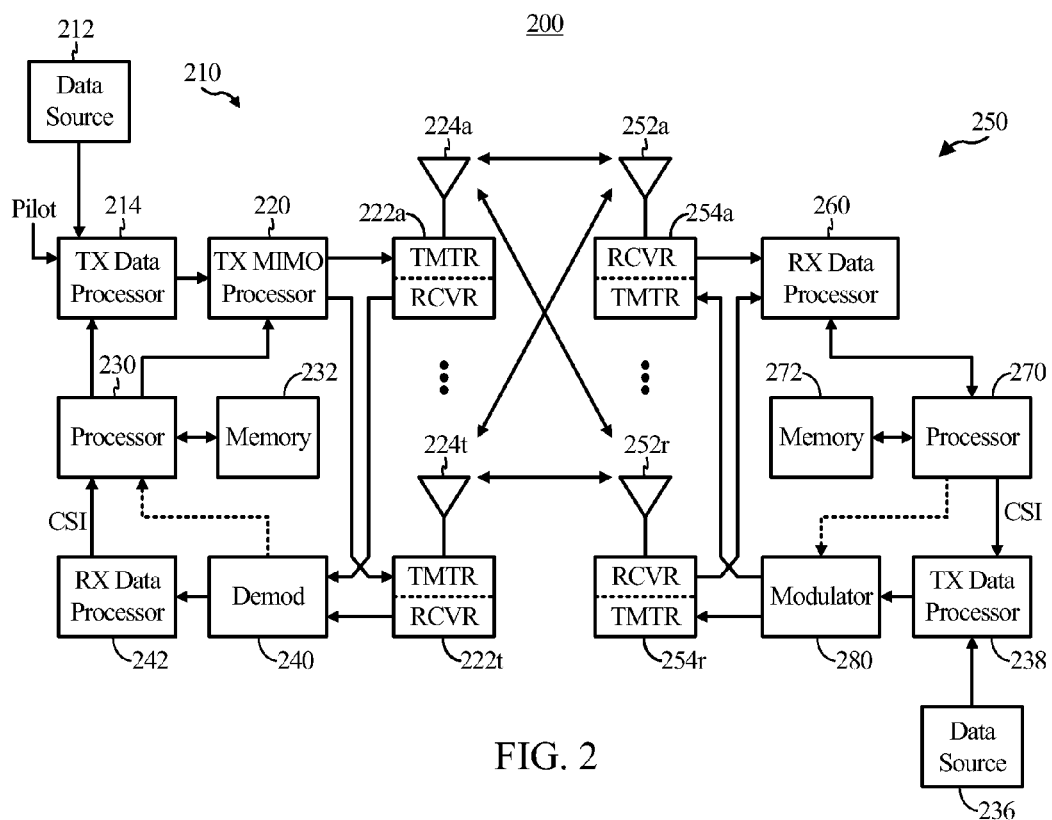
FIG. 2 is a block diagram illustrating another wireless communication system.

FIG. 2 is a diagram illustrating an exemplary Multiple-Input and Multiple-Output (MIMO) wireless communication system 200 including a NAP 210 and an access terminal 250. Although the wireless communication system 200 shows one NAP and one access terminal 250 for the sake of brevity, it is understood by one skilled in the art that the system 200 may include more than one NAP and/or more than one access terminal.

Each access terminal 250 may communicate with one or more NAPs 210 via transmissions on the forward links or reverse links. These communication links may be established via a single-in-single-out, a multiple-in-single-out or a MIMO system. A MIMO system may employ multiple ($N_T$) transmit antennas and multiple ($N_R$) receive antennas for data transmission. A MIMO channel may be formed by the $N_T$ transmit and $N_R$ receive antennas and may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability), if the additional dimensionalities created by the multiple transmit and receive antennas are used.

A MIMO system may support a time division duplex (TDD) or FDD system. In the TDD system, the forward and reverse link transmissions may use the same frequency region (e.g., frequency band) so that the forward link channel response may be estimated from the reverse link channel response (e.g., measured reverse link channel response). From the estimation of forward link channel response, the NAP 210 may adjust power levels and beamforming gain on the forward link when multiple antennas are used at the NAP 210.

At the NAP 210, traffic data for a number of data streams may be provided from a data source 212 to a transmit (TX) data processor 214. In certain exemplary embodiments, each data stream may be transmitted over a respective transmit antenna 224a through 224t. The TX data processor 214 may format, code and interleave the traffic data for each data stream based on a particular coding scheme selected for that data stream to provide coded data.

The coded data for each data stream may be multiplexed with pilot data using, for example, orthogonal frequency division multiplexing (OFDM) techniques. The pilot data may additionally or alternatively be frequency division multiplexed (FDM), time division multiplexed (TDM), code division multiplexed (CDM) or multiplex using other techniques. The pilot data typically is a known data pattern that is processed in a known manner and may be used at the access terminal 250 to estimate a channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK) or M-quadrature amplitude modulation (M-QAM), among others). The data rate, coding, and modulation for each data stream may be determined by instructions performed on the processor 230 or provided by the processor 230.

A TX MIMO processor 220 of the NAP 210 may receive the modulation symbols from the TX data processor 214 for each data stream and may further process the modulation symbols (e.g., for OFDM). The TX MIMO processor 220 may provide $N_T$ modulation symbol streams to the $N_T$ transmitters (TMTR) 222a through 222t. In various embodiments, the TX MIMO processor 220 may apply beamforming weights to the symbols of the data streams and to the antenna from which the symbols are being transmitted.

Each transmitter 222a through 222t may receive and process a respective symbol stream to provide one or more analog signals, and may further condition (e.g., amplify, filter, and/or upconvert) the one or more analog signals to provide a modulated signal suitable for transmission over a MIMO channel. $N_T$ modulated signals from the transmitters 222a through 222t may be transmitted from the $N_T$ antennas 224a through 224t, respectively.

At the access terminal 250, the transmitted modulated signals may be received via $N_R$ antennas 252a through 252r. The received signal from each antenna 252a through 252r may be provided to a respective receiver (RCVR) 254a through 254r. Each receiver 254a through 254r may condition (e.g., amplify, filter, and/or downconvert) the received signal, may digitize the conditioned signal to provide samples, and may process the samples to provide a symbol stream corresponding to the stream sent by the NAP 210.

An RX data processor 260 may receive and process the $N_R$ received symbol streams from the $N_R$ receivers 254a through 254r based on a particular receiver processing technique to provide $N_T$ "detected" symbol streams. The RX data processor 260 may demodulate, deinterleave, and/or decode each detected symbol stream to recover the traffic data for the data stream. The processing by the RX data processor 260 is complementary to that performed by the TX MIMO processor 220 and the TX data processor 214 at the NAP 210.

A processor 270 may determine (e.g., periodically, based on system performance or during predetermined intervals) which pre-coding matrix to use. The processor 270 may formulate a reverse link message including a matrix index portion and a rank value portion.

The reverse link message may include various types of information regarding the communication link and/or the received data stream. The reverse link message may be processed by a TX data processor 238. The TX data processor 238 may receive traffic data for a number of data streams from a data source 236, which is then modulated by a modulator 280, conditioned by transmitters 254a through 254r, and transmitted back to the NAP 210.

At the NAP 210, the modulated signals from the access terminal 250 may be received by the antennas 224a through 224t, may be conditioned by receivers 222a through 222t, may be demodulated by a demodulator 240, and may be processed by a RX data processor 242 to extract the reverse link message transmitted by the access terminal 250. The processor 230 may process the extracted message to determine which pre-coding matrix to use for determining the beamforming weights.

The processors 230 and 270 may direct (e.g., control, coordinate or manage) the operation of NAP 210 and the access terminal 250, respectively. Memories 232 and 272 may be associated with the processors 230 and 270, respectively. The memory 232 may store program code and data for execution on the processor 230 and the memory 272 may store program code and data for execution on the processor 270. The processors 230 and 270 may perform computations to derive frequency and impulse response estimates for the uplink and downlink, respectively.

Figure 3:
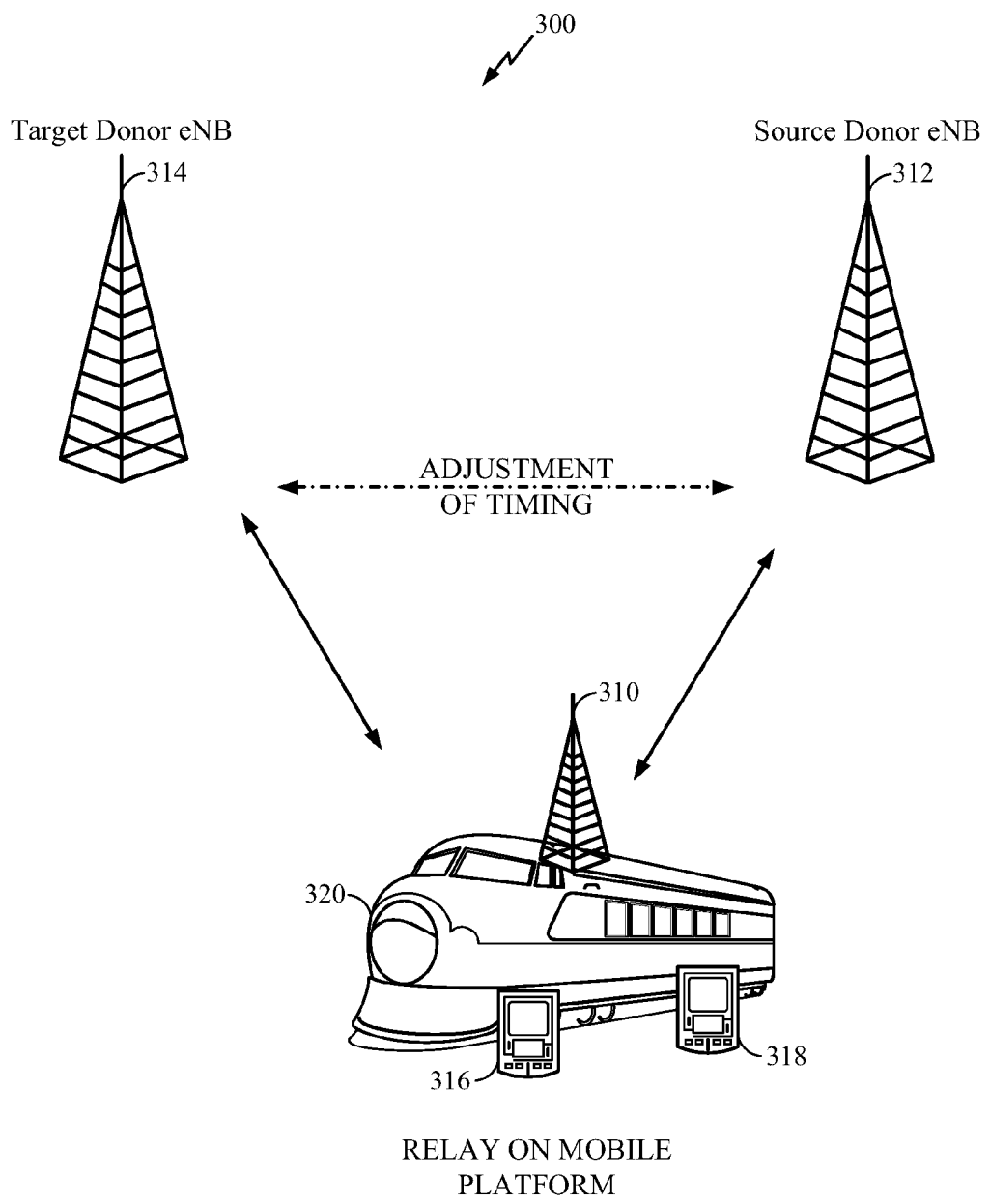
FIG. 3 is a diagram illustrating an exemplary system showing a mobile relay and source and target network access points according to an exemplary embodiment.

FIG. 3 is a diagram illustrating an exemplary system 300 showing a mobile relay 310, a source NAP 312 (also referred to as a source eNB or source base station) and a target NAP 314 (also referred to as a target eNB or target base station). Mobile relay 310 may be positioned on a mobile platform 320, such as a vehicle or other moving platform, and the positioning and associated coverage of the mobile relay 310 may be transferred from the source eNB 312 to the target eNB 314. To mitigate service interruptions to connected-state access terminals 316 or 318 (e.g., user equipment) served by the mobile relay 310 during the repositioning of the mobile platform 320, the mobile relay 310 may adjust synchronization timing of the mobile relay 310 from the synchronization timing of the source eNB 312 to the synchronization timing of the target eNB 314. That is, when the source eNB 312 and target eNB 314 are asynchronous with respect to each other, the mobile relay 310 may be set to the synchronization timing of the source eNB 312 or target eNB 314 that is to serve the mobile relay 310.

The mobile relay 310 may include the same or substantially similar components as the NAP 210 including a processor 230. The processor 230 may be used for repositioning coverage of the mobile relay 310 from the source base station 312 to a target base station 314 and for adjusting timing of the mobile relay 310. A memory 232 may be coupled to the processor 230 for storing data. The processor 230 may receive a signal indicating a synchronization timing of the target base station 314, which is different from a current synchronization timing of the mobile relay 310, and may control an adjustment of the synchronization timing of the mobile relay 310 based on the synchronization timing indicated in the received signal. The mobile relay 310 may further include one or more transmitters/receivers 222a . . . 222t for externally communicating information synchronized to the synchronization timing indicated in the received signal. The processor 230, based on one of detecting: (1) a signal from the target base station 314; or (2) an instruction from the source base station 312, may determine whether a handover operation is to be initiated to handover the mobile relay 310 from the source base station 312 to the target base station 314. The processor 230 of the mobile relay 310 may control transmission of a command to one or more access terminals 316 and 318 for adjusting a radio link failure interval.

In certain embodiments, the adjustment of the synchronization timing may be based on, for example, an incoming signal from the target eNB 314 and may be determined from the known pilot symbols in the incoming signal or synchronization information in the incoming signal. That is, for example, the timing of the known pilot symbols may be determined and used to adjust the synchronization timing for the mobile relay 310. In addition, the signal may include a frame structure (e.g., a sequence of different types of control data or payload data) which may also be used to determine the proper synchronization (e.g., location) of each subframe.

Figure 4:
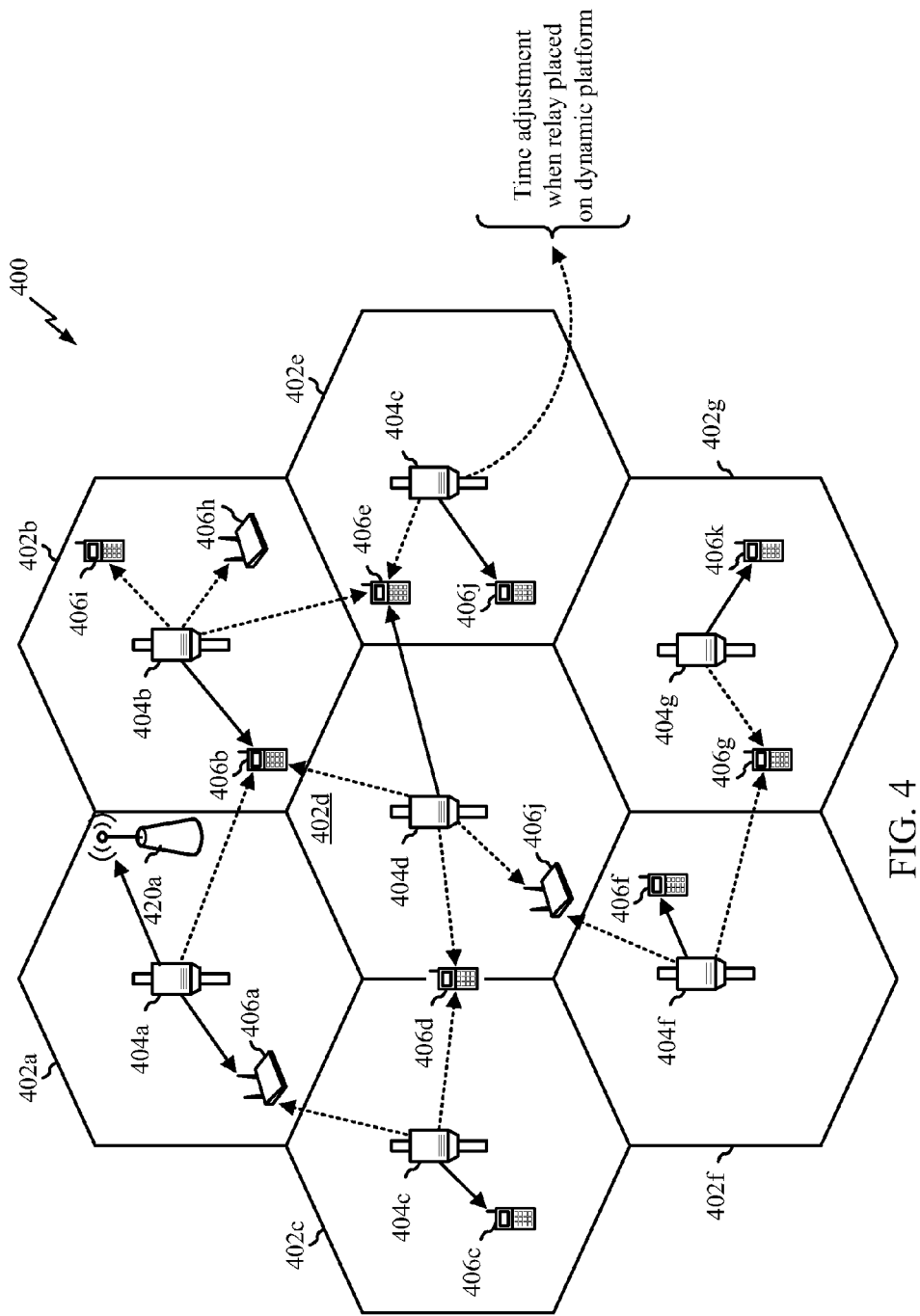
FIG. 4 is a diagram illustrating a multiple access wireless communication system that includes a mobile relay according to another exemplary embodiment.

FIG. 4 illustrates an exemplary wireless communication system 400 configured to enable timing adjustment for mobile relays 420a in asynchronous networks. The wireless communication system 400 may be an LTE system or some other system. The wireless communication system 400 may provide communication within multiple cells, for example, macro cells 402a, 402b ... 402g. Each macro cell 402a, 402b ... 402g may be served by a corresponding network access point NAP or eNB 404a, 404b ... 404g. Each macro cell 402a, 402b ... 402g may be further divided into one or more sectors. Various devices (for example, access terminals 406a, 406b ... 406k may be scattered throughout the wireless communication system 400. Each access terminal 406a, 406b ... 406k may communicate with one or more NAPs or eNBs 404a, 404b ... 404g on a forward link (FL) and/or a reverse link (RL) at a given moment, depending upon, for example, whether the access terminal 404a, 404b ... 404g is active and whether the access terminal 404a, 404b ... 404g is in a soft handover. Wireless communication system 400 may provide service over a large geographic region, for example, macro cells 402a, 402b ... 402g may cover a few blocks in a neighborhood and may enable repositioning of mobile relay 420a.

Figure 5:
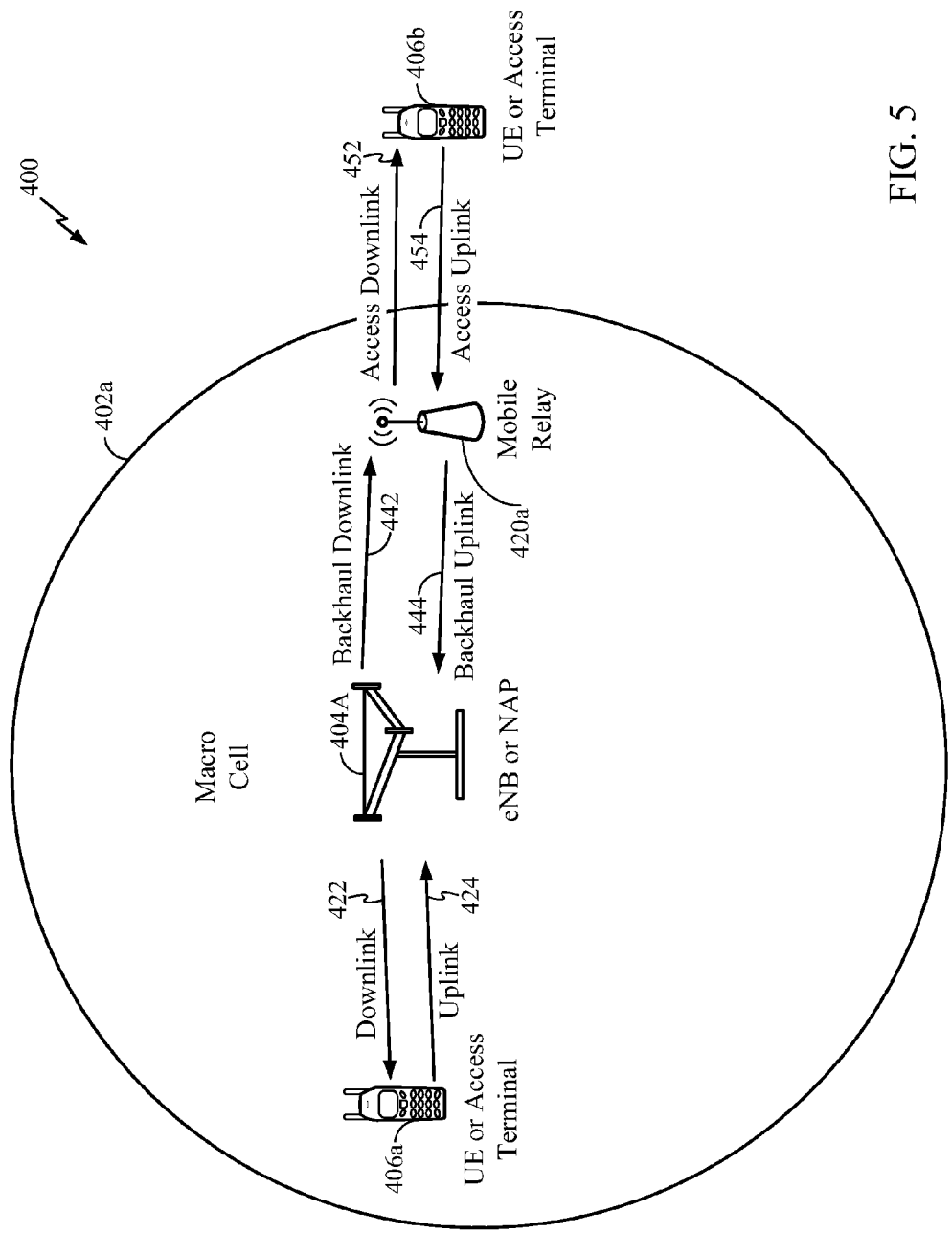
FIG. 5 is a diagram illustrating a macro cell of the wireless communication system of FIG. 4.

FIG. 5 is a diagram illustrating the macro cell 402a of the wireless communication system 400 to illustrate the operation of the mobile relay 420a. Referring to FIG. 5, the mobile relay 420a may be a device that receives a transmission of data and/or other information from upstream (e.g., the eNB 404a or access terminal 406b) and may send (e.g., relay) a transmission of the data and/or other information downstream to (e.g., the access terminal 406b or the eNB 404a). The mobile relay 420a may be an access terminal (or user equipment (UE)) that may relay transmissions for other access terminals. The mobile relay 420a may communicate with the eNB 404a and the access terminal 406b to facilitate communication between the eNB 404a and the access terminal 406b.

The access terminals 406a and 406b may be located inside or outside the macro cell 402a and each access terminal 406a and 406b may be stationary (e.g., substantially or absolutely fixed) or may be mobile. The access terminals 406a and 406b may function as cellular phones, personal digital assistants (PDAs), wireless modems, wireless communication devices, handheld devices, laptop computers, cordless phones and/or wireless local loop (WLL) stations, among others. The access terminals 406a may communicate directly with the eNB 404a using a downlink 422 and/or an uplink 424. The access terminal 406b may communicate with the eNB 404a using the mobile relay 420a via a backhaul downlink 442, a backhaul uplink 444, an access downlink 452 and/or an access uplink 454.

The downlinks (or forward links) refer to the communication links from: (1) the eNB 404a to the mobile relay 420a or the mobile relay 420a to the access terminal 406b; or (2) the eNB 404a to the access terminal 406a. The uplinks (or reverse links) refer to the communication links from: (1) the access terminals 406a or 406b to the eNB 404a or the mobile relay 420a; or (2) the mobile relay 420a to the eNB 404a.

In general, each eNB may communicate with any number of access terminals and any number of mobile relays, and each mobile relay may communicate with any number of eNBs and any number of access terminals.

The multiple access wireless communication system 400 may use LTE, which uses, for example, orthogonal frequency division multiplexing (OFDM) on the downlinks 422, 442 and 452 and single-carrier frequency division multiplexing (SC-FDM) on the uplinks 424, 444 and 454. OFDM and SC-FDM partition a frequency range into multiple ($N_{FFT}$) orthogonal subcarriers, which are commonly referred to as tones or bins, among others. Each subcarrier may be modulated with data. In general, modulation symbols may be sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for the system bandwidth of 1.25, 2.5, 5, 10 or 20 megahertz (MHz), respectively.

The multiple access wireless communication system 400 may use FDD or TDD. For FDD, the downlinks 422, 442 and 452 and the uplinks 424, 444 and 454 are allocated separate frequency channels. Downlink transmissions and uplink transmissions may be sent concurrently on the two frequency channels. For TDD, the downlinks 422, 442 and 452 and the uplinks 424, 444 and 454 share the same frequency channel. The downlink and uplink transmissions may be sent on the same frequency channel in different time intervals.

Adjustment of synchronization timing for handover of a mobile relay in a system that includes the eNB 404a, the mobile relay 420a and the access terminal 406b may occur by one or more timing adjustment procedures. The timing adjustment procedures include: (1) the mobile relay 420a handing over the access terminal 406b to the eNB 404a (e.g., handing over the access terminal 406b served by the mobile relay 420a to the eNB 404a), prior to handover of the mobile relay 420a to the eNB 404a and then handing back the access terminal 406b to the mobile relay 420a; (2) the mobile relay 420a adjusting the synchronization timing of the backhaul links 442 and 444 and the access links 452 and 454 concurrently without informing the access terminal 406b of the synchronization timing changes; (3) the mobile relay 420a adjusting the synchronization timing of the backhaul links 442 and 444 and the access links 452 and 454 concurrently with access terminal notification to the access terminal 406b, which implements particular handling procedures; (4) the mobile relay 420a adjusting the synchronization timing of the backhaul links 442, and 444 (e.g., only the backhaul links 442 and 444; exclusive of synchronization timing adjustment to the access links 452 and 454); (5) the mobile relay 420a adjusting the synchronization timing of the backhaul links 442 and 444 and the access links 452 and 454 sequentially; and (6) the use of the same or similar timing adjustment procedures outlined in items (1) to (5) with multicarrier handover processes. For example, each adjustment procedure enables the repositioning of coverage of the mobile relay from a first network access point to a second network access point and the adjustment of synchronization timing of the mobile relay in an asynchronous network. Each of these timing adjustment procedures is detailed below.

It is contemplated that any of the timing adjustment procedures may be used and that any particular timing adjustment procedure may be dynamically selected by the eNB 404a, the eNB 404b or the mobile relay 420a for timing adjustment based on operational attributes including, for example, received signal strength. The selected timing procedure may be selected to reduce: (1) the handover interval; (2) data transfers; (3) buffer requirements; or (4) radio link failures, among others.

Figure 6:
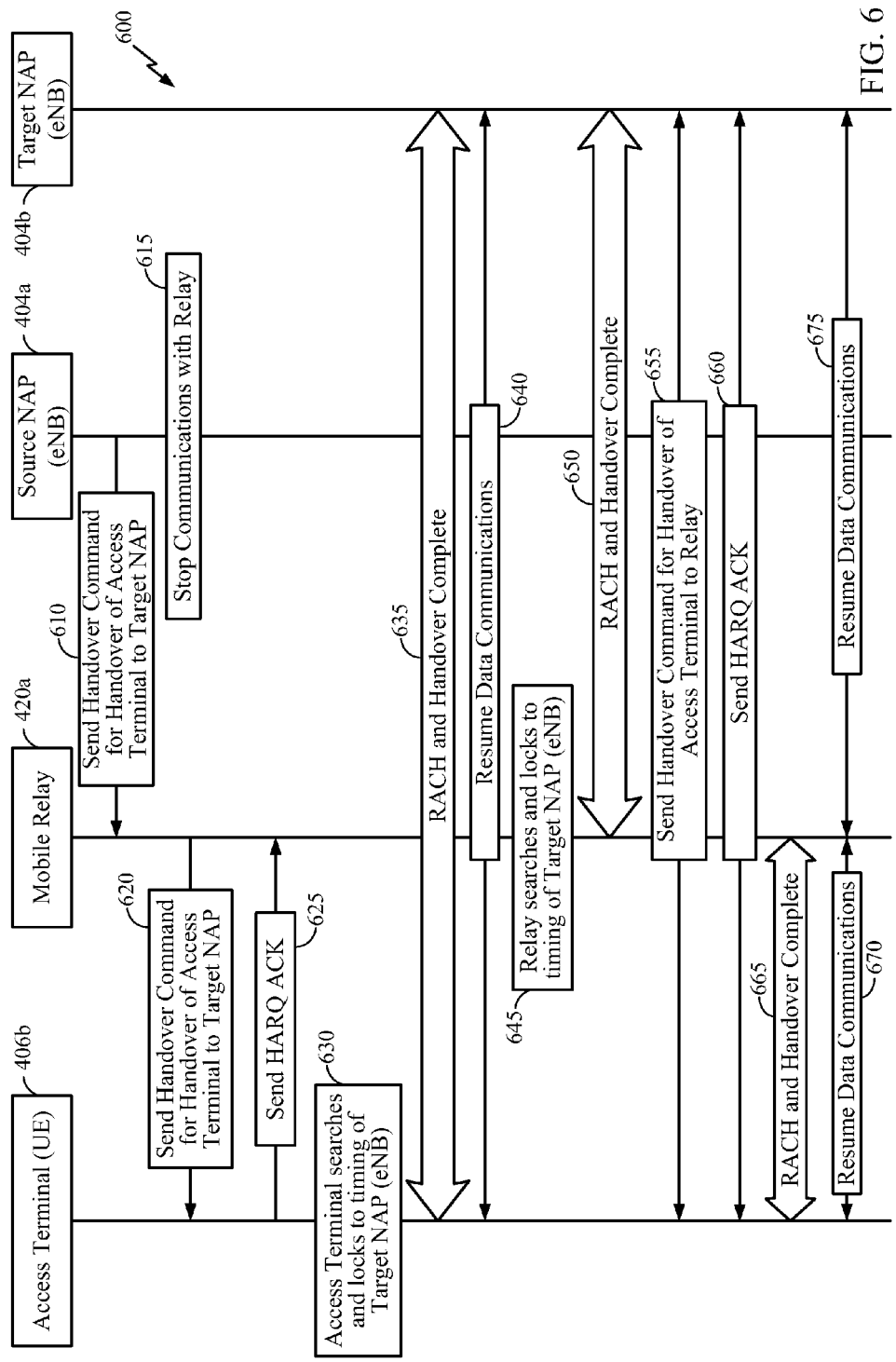
FIG. 6 is a timing diagram illustrating an exemplary message exchange among a mobile relay, an access terminal, and source/target network access points in accordance with various exemplary embodiments.

FIG. 6 is a timing diagram illustrating an exemplary message exchange 600 among a mobile relay, an access terminal, and source/target network access points in accordance with various exemplary embodiments.

Referring to FIG. 6, at block 610, the source eNB or NAP 404a may send to the mobile relay 420a a handover command (e.g., an instruction) indicating that the mobile relay 420a is to be handed over from the source eNB 404a to the target eNB 404b. Prior to block 610, the mobile relay 420a may detect a signal, for example, from the target eNB 404b and may determine from the detected signal that a handover to the target eNB 404b is desirable.

The mobile relay 420a may send to the source eNB 404a a communication (not shown) indicating a desire for the mobile relay 420a to be handed over to the target eNB 404b. The communication may include other information used by the mobile relay 420a to determine the desirability to be handed over to the target eNB 404b, for example, (1) the strength of the target eNB signal (e.g., the relative strength of the target eNB signal to the source eNB signal or the strength of the target and source eNB 404a signals to predetermined thresholds); and/or (2) the relative changes of strength of the target eNB signal and source eNB signal over an interval. The source eNB 404a may determine from the information in the communication and other operating parameters (e.g., (1) load information, such as the number of access terminals served by the source eNB 404a; (2) channel estimates; and/or (3) operational status, among others) whether to initiate a handover command at block 610. For example, the mobile relay 420a may determine whether a handover operation is to be initiated for the handover of the mobile relay 420a from the eNB 404a (a first NAP) to the eNB 404b (a second NAP). The determination may include detecting, by the mobile relay, one of: (1) a signal level from the second NAP; or (2) a handover instruction from the first NAP instructing the mobile relay 420a to initiate the handover operation.

At block 615, the source eNB 404a may stop communication (e.g., all communication) with the mobile relay 420a. Alternatively, in certain exemplary embodiments, a soft handover may be implemented in which communication between the source eNB 404a and the mobile relay 420a may continue until the handover of the mobile relay 420a to the target eNB 404b is completed. At block 620, a handover command may be sent to the access terminal 406b served by the mobile relay 420a to handover the access terminal 406b to the macro cell (e.g., of the target eNB 404b). At block 625, the access terminal 406b may send to the mobile relay 420a an acknowledgment (e.g., a HARQ acknowledgement) that the handover command had been properly received and decoded.

At block 630, the access terminal 406b may search for a signal associated with the target eNB 404b (e.g., a signal from the target eNB 404b itself or another signal with the synchronization timing associated with the target eNB 404b) and may lock (e.g., synchronize) timing to the target eNB 404b. That is, the access terminal 406b may adjust its synchronization timing to the synchronization timing of the target eNB 404b. It is understood by one skilled in the art that many techniques exist for such synchronization, for example, synchronization may be based on correlation of known pilot symbols in the incoming signal from the target eNB 404b, synchronization information in the incoming signal and/or a determination of the frame structure of the incoming signal.

In certain exemplary embodiments, during the handover operation, a link may be established between the access terminal 406b and the target eNB 404b by: (1) sending random access channel (RACH) occasion information in a handover command that identifies time and frequency (e.g., time and frequency allocations) for using the RACH; and (2) acquiring by the access terminal 406b using a search procedure for the synchronization timing of the target eNB 404b. The source eNB 404a and/or the target eNB 404b may send one or more commands to other neighboring access terminals to control time and frequency allocations of the other neighboring access terminals during the search procedure at block 630. In various exemplary embodiments, the source eNB 404a and/ or the target eNB 404b may silence the neighboring access terminals (on the communication link/channel searched by the access terminal 406b) to improve the signal to noise ratio of the incoming signal associated with the target eNB 404b.

At block 635, RACH and handover operations are completed between the access terminal 406b and target eNB 404b and, at block 640, data communication is resumed. That is, data communication from between the access terminal 406b and the mobile relay 420a may be transferred to between the access terminal 406b and target eNB 404b.

At block 645, the mobile relay 420a may search for a signal associated with the target eNB 404b (e.g., a signal from the target eNB 404b itself or another signal with the synchronization timing associated with the target eNB 404b) and may lock timing to the target eNB 404b. The mobile relay 420a may initiate the searching and locking process based on the receipt of the acknowledgment, at block 625. That is, the searching and locking process may be initiated responsive to receipt of the acknowledgment or a predetermined delay period after receipt of the acknowledgment. At block 650, RACH and handover operations are completed between the mobile relay 420a and the target eNB 404b. At block 655, data communication is resumed between the mobile relay 420a and the target eNB 404b.

At block 660, the target eNB 404b may send to the access terminal 406b a handover command indicating that the access terminal 406b is to be handed over from the target eNB 404b to the mobile relay 420a. At block 665, the access terminal 406b may send to the target eNB 404b an acknowledgment (e.g., a HARQ acknowledgment).

At block 670, RACH and handover operations are completed between the access terminal 406b and mobile relay 420a. At block 675, data communication is resumed between the access terminal 406b and the mobile relay 420a.

The timing adjustment procedure described with regard to FIG. 6 typically supports legacy access terminals (UEs), as well as providing support for both Multimedia Broadcast Multicast Service Single Frequency Network (MBSFN) and blank subframes.

Although one access terminal is included in the message exchange 600, it is understood by one skilled in the art that more than one access terminal may be included in such an exchange and that such access terminals may have timing adjustment procedures completed concurrently or sequentially.

Figure 7:
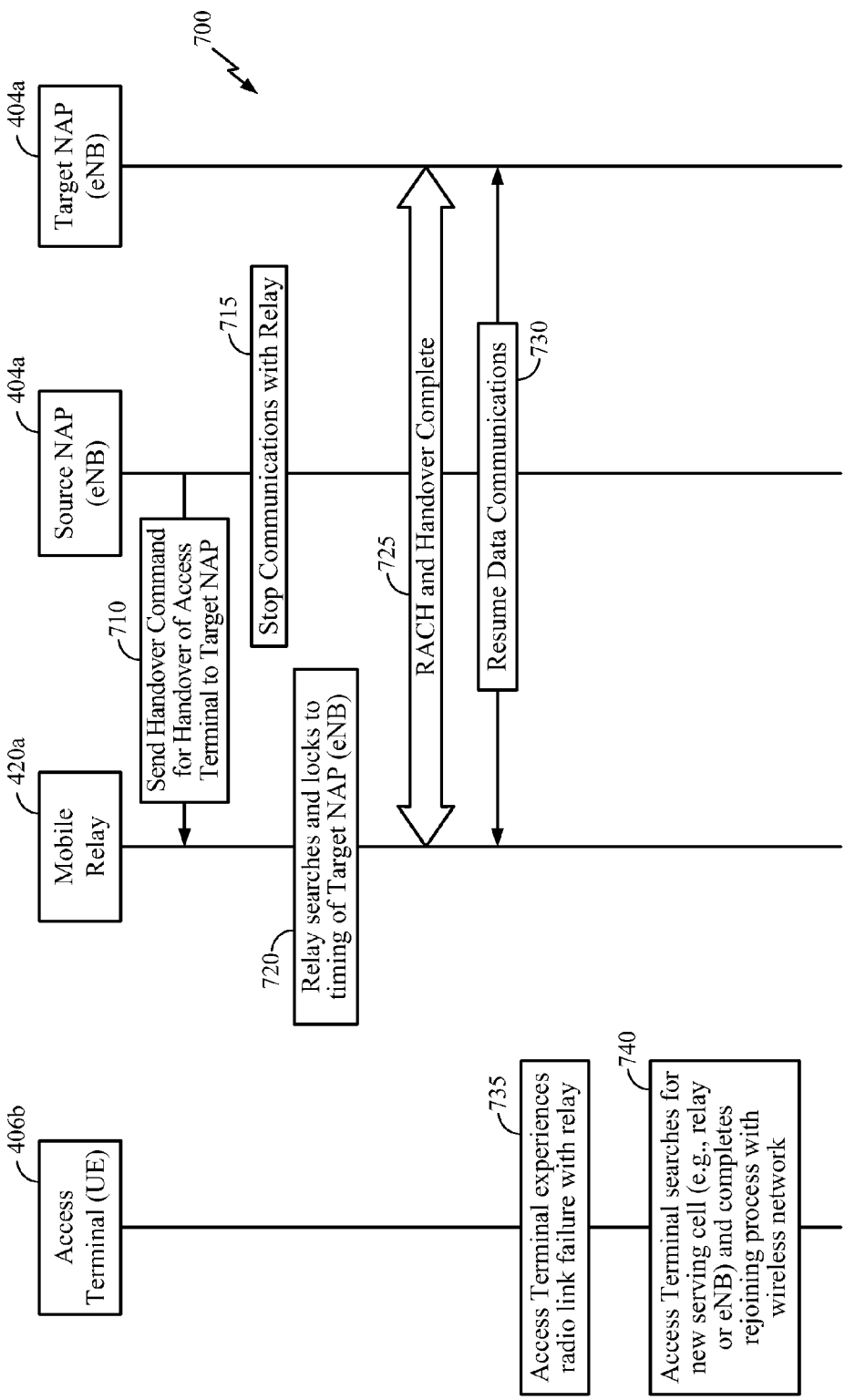
FIG. 7 is a timing diagram illustrating another exemplary message exchange among a mobile relay, an access terminal, and source/target network access points in accordance with various exemplary embodiments.

FIG. 7 is a timing diagram illustrating another exemplary message exchange 700 among a mobile relay, an access terminal, and source/target network access points in accordance with various exemplary embodiments.

Referring to FIG. 7, at block 710, the source eNB 404a may send to the mobile relay 420a a handover command indicating that the mobile relay 420a is to be handed over from the source eNB 404a to the target eNB 404b. At block 715, the source eNB 404a may stop communication (e.g., all communication) with the mobile relay 420a.

At block 720, the mobile relay 420a may search for a signal associated with the target eNB 404b (e.g., a signal from the target eNB 404b itself or another signal with the synchronization timing associated with the target eNB 404b) and may lock (e.g., synchronize) timing to the target eNB 404b. The mobile relay 420a may initiate the searching and locking process based on the receipt of the handover command, at block 710. For example, the mobile relay 420a may determine from a received signal the synchronization timing associated with the target eNB 404b and may lock the synchronization timing of the mobile relay 420a to the determined synchronization timing.

At block 725, RACH and handover operations are completed between the mobile relay 420a and the target eNB 404b and, at block 730, data communication is resumed such that data communication from between the mobile relay 420a and the source eNB 404a is transferred to between the mobile relay 420a and the target eNB 404b. During the handover operation, the synchronization timing of both the backhaul links 442 and 444 and the access links 452 and 454 may be adjusted concurrently causing a lack of synchronization on the access links 452 and 454 between the mobile relay 420a and the access terminal 406b (e.g., served by the mobile relay 420a).

At block 735, the access terminal 406b may experience radio link failure due to the lack of synchronization with the mobile relay 420a. At block 740, the access terminal 406b may search for a new serving cell (e.g., a mobile relay or an eNB) to rejoin the wireless network 400 and may complete the rejoining process with the new serving cell using the searching, locking and RACH procedures discussed above.

Each of the access terminals 406a and 406b may include a radio link failure (RLF) timer that may be adjusted based on a RLF timer command. The source eNB 404a or the mobile relay 420a may send the RLF timer command to reduce the service outage period of the access terminal 406b when RLF failure is intended to occur due to synchronization timing adjustment of the access links 452 and 454 of mobile relay 420a. The access terminal 406b may search for a new serving cell after the RLF time period has expired. The new serving cell is likely be the same cell as the previous serving cell and the mobile relay 420a may again serve the access terminal 406b after the synchronization timing adjustment of the access links 452 and 454 of the mobile relay 420a.

The timing adjustment procedure described with regard to FIG. 7 typically supports legacy access terminals (UEs), as well as providing support for both MBSFN and blank subframes.

In certain exemplary embodiments, the mobile relay 420a may adjust the synchronization timing of both the backhaul links 442 and 444 and the access links 452 and 454 concurrently, which may cause the radio link failure for the access terminal 406b. Alternatively, it is also contemplated that the mobile relay 420a may adjust the synchronization timing of the backhaul links 442 and 444 (e.g., only the backhaul links 442 and 444) and may maintain the synchronization timing of the access links 452 and 454. It is understood by one skilled in the art that if the synchronization timing of the access links 452 and 454 is maintained (unchanged either permanently or temporarily), the radio link failure can be avoided. In FIG. 7, if synchronization timing is maintained for the access links 452 and 454, blocks 735 and 740 may be eliminated in the message exchange 700. In such a configuration, however, the backhaul links 442 and 444, and access links 452 and 454 may operate asynchronously relative to each other. This configuration in which synchronization timing of the access links is maintained, typically: (1) supports legacy access terminals (UEs); (2) substantially eliminates service interruption due to handover; (3) eliminates reselection for idle-state access terminals; and (4) provides a fast handover procedure for mobile relays.

The choice for backhaul subframes may be subject to existing access link subframe assignments. In certain exemplary embodiments, portions of the frame may be shared for both the backhaul links 442 and 444 and the access links 452 and 454. Certain subframes may be assigned to access links 452 and 454, for example subframes 0, 4, 5, and 9. The remaining portions of the frame structure may be assigned to backhaul subframes. Because the timing within a frame may be asynchronous, the backhaul and access subframes may not be interchangeable.

In certain exemplary embodiments, the backhaul subframes may be set contiguously in each frame to increase efficiency due to the backhaul and access links 442, 444, 452 and 454 operating asynchronously. For example, the Physical Random Access Channel (PRACH) may extend over two uplink backhaul subframes; and/or the Random Access Response (RAR) may extend over two downlink backhaul subframes. That is, a plurality of contiguous subframes may be established for each of the backhaul links.

In certain exemplary embodiments, the mobile relay 420a may have to report the target cell synchronization timing to the source cell such that the source cell may request proper RACH occasion and backhaul resources in the target cell without interrupting the service on the access links.

Figure 8:
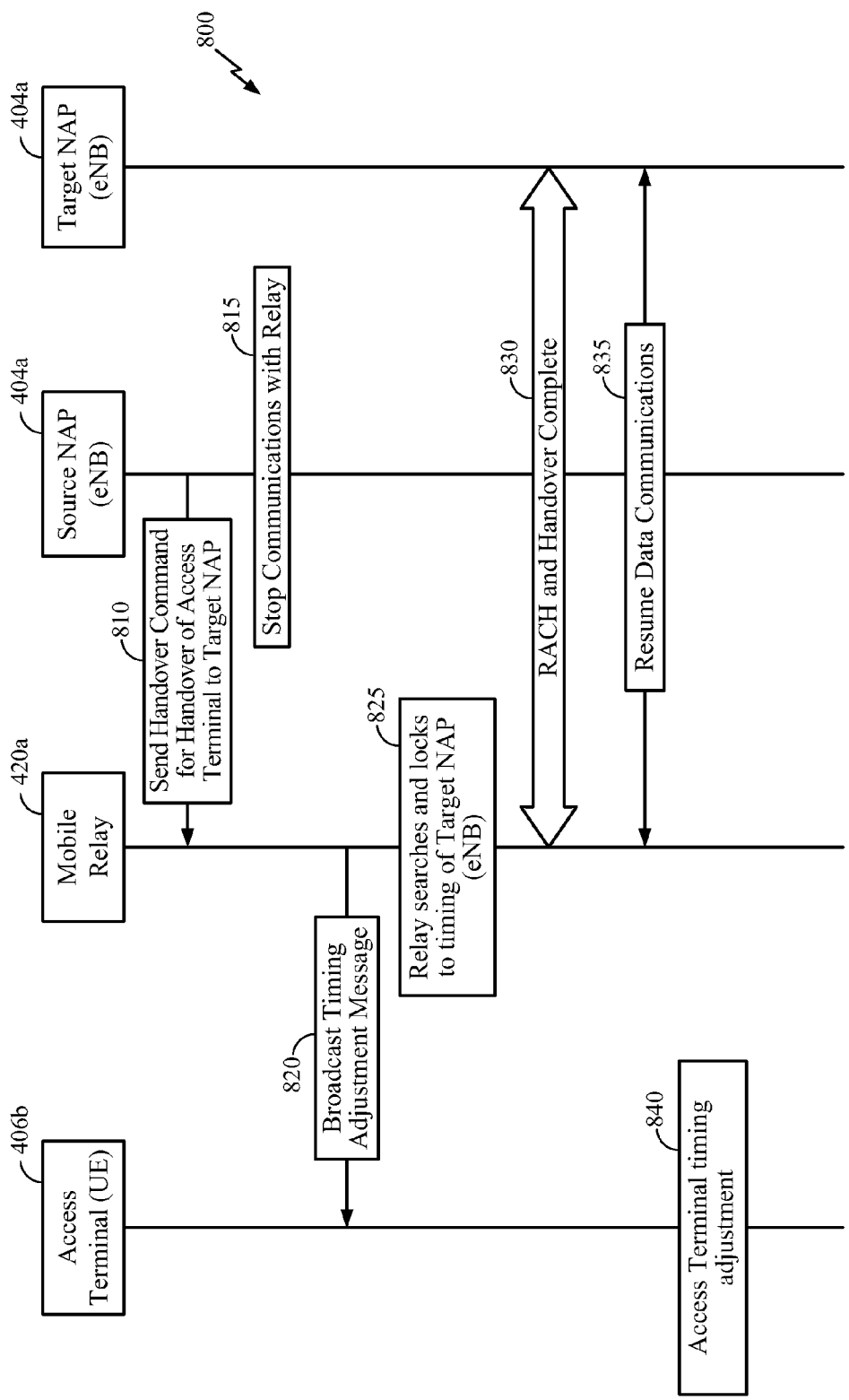
FIG. 8 is a timing diagram illustrating a further exemplary message exchange among a mobile relay, an access terminal, and source/target network access points in accordance with various exemplary embodiments.

FIG. 8 is a timing diagram illustrating a further exemplary message exchange 800 among a mobile relay, an access terminal, and source/target network access points, and includes a time adjustment message in accordance with various exemplary embodiments. The time adjustment message may implement particular handling procedures.

Referring to FIG. 8, at block 810, the source eNB 404a may send to the mobile relay 420a a handover command indicating that the mobile relay 420a is to be handed over from the source eNB 404a to the target eNB 404b. At block 815, the source eNB 404a may stop communication (e.g., all communication) with the mobile relay 420a.

At block 820, the mobile relay 420a may broadcast to the access terminal 406b served by the mobile relay 420a a timing adjustment message in which a service interruption gap (e.g., or interval) may be defined for handover of the mobile relay 420a to the target eNB 404b. The time adjustment message may inform the access terminal 406b of the service interruption and may define a resynchronization time to reestablish the access links 452 and 454 with the mobile relay 420a.

At block 825, the mobile relay 420a may search for a signal associated with the target eNB 404b (e.g., a signal from the target eNB 404b itself or another signal with the synchronization timing associated with the target eNB 404b) and may lock timing to the target eNB 404b. The mobile relay 420a may initiate the searching and locking process based on the receipt of the handover command at block 810.

At block 830, RACH and handover operations are completed between the mobile relay 420a and the target eNB 404b and, at block 835, data communication is resumed such that the data communication from between the mobile relay 420a and source eNB 404a is transferred to between the mobile relay 420a and target eNB 404b. During the handover operation, the synchronization timing of both the backhaul links 442 and 444 and the access links 452 and 454 may be adjusted concurrently causing a lack of synchronization between the mobile relay 420a and the access terminal 406b.

At the end of the service interruption gap (e.g., at the resynchronization time), the access terminal 406b may adjust its synchronization timing. The adjustment of synchronization timing may occur using synchronization information sent in the broadcast message at block 820. That is, data communication from between the access terminal 406b and the mobile relay 420a may be reestablished after the service interruption gap.

For example, the mobile relay 420a may broadcast synchronization information indicating its synchronization timing and service interruption information defining a service interruption interval for handover of the mobile relay 420a to the target eNB 404 such that the adjusting of the synchronization timing of the mobile relay 420a occurs prior to an end of the service interruption interval. After the service interruption interval, the synchronization timing of one or more access terminals 406b may be adjusted in accordance with the synchronization timing in the synchronization information.

Alternatively, the synchronization timing of the access terminal 406b may be adjusted by (1) searching for an incoming signal synchronized to the target eNB 404b (e.g., from the mobile relay 420a or the target eNB 404b); (2) locking timing to the incoming signal timing to reestablish the access links 452 and 454 with the mobile relay 420a; (3) completing the RACH and handover operations between the access terminal 406b and the mobile relay 420a and (4) resuming data communication.

The timing adjustment procedure described with regard to FIG. 8 typically supports both MBSFN and blank subframes and may reduce the time of a service interruption.

In certain exemplary embodiments, the access terminal 406b may refine its uplink synchronization, because the mobile relay 420a may make further synchronization timing adjustment after the RACH procedure.

In various exemplary embodiments, the mobile relay 420a may be handed over to the target eNB 404b via a handover operation in which the mobile relay 420a adjusts the synchronization timing of the backhaul links 442 and 444 and maintains the synchronization timing of the access links 452 and 454 temporarily (i.e., for an asynchronous transition period, (e.g., a predetermined period)). The mobile relay 420a may operate during the asynchronous transition period with different backhaul/access link synchronization timings. After the asynchronous transition period, the mobile relay 420a may adjust synchronization timing on the access links 452 and 454. Different methods for adjusting the synchronization timing include, for example: (1) slowly adjusting (e.g., within a range of about 1 second to about 50 seconds) the access link synchronization timing; or (2) during the asynchronous transition period, the mobile relay 420a may send a handover command to the access terminal 406b served by the mobile relay 420a informing the access terminal 406b of a time for the access terminal 406b to be handed over to the mobile relay. The mobile relay 420a may determine an instance when the mobile relay 420a will switch access link synchronization timing. That is, the handover command may instruct the access terminal 406b to start the RACH procedure after the access synchronization timing has been adjusted. For example, the "slow" timing adjustments of the access links may be adjusted at a rate in accordance with the skew rate associated with the synchronization timing of the access terminal 406b. That is, the synchronization timing may be adjusted at a rate sufficiently slow that the access terminal 406b is unaware of the adjustment in access link synchronization timing. For example, the adjustment of the synchronization timing of each respective access link may be at a rate sufficiently slow to maintain data communication between the mobile relay and the access terminal associated with the respective access link during the transition period (e.g., during the entire transition period).

In certain exemplary embodiments, the mobile relay 420a may communicate with the network access points 404a or 404b using one or more backhaul links 442 and 444 and with each of one or more access terminals 406b using one or more access links 452 and 454. For each access link of the mobile relay 420a associated with the one or more access terminals 406b, the mobile relay 420a may transition a synchronization timing of the access links 452 and 454 from the current synchronization timing to a different synchronization timing during the transition period responsive to the synchronization timing associated with the backhaul links 442 and 444 of the mobile relay 420a being adjusted.

In certain exemplary embodiments, when a plurality of access terminal are transitioning, different access terminals may start the RACH procedure in a sequential order as determined by the mobile relay 420a via information in the handover command. For example, the mobile relay 420a may determine a sequential order for each of the one or more access terminals 406b to be handed over to the mobile relay 420a and may initiate the RACH procedure to handover the one or more access terminals 406b served by the mobile relay 420a after a predetermined time in the determined sequential order.

Figure 9:
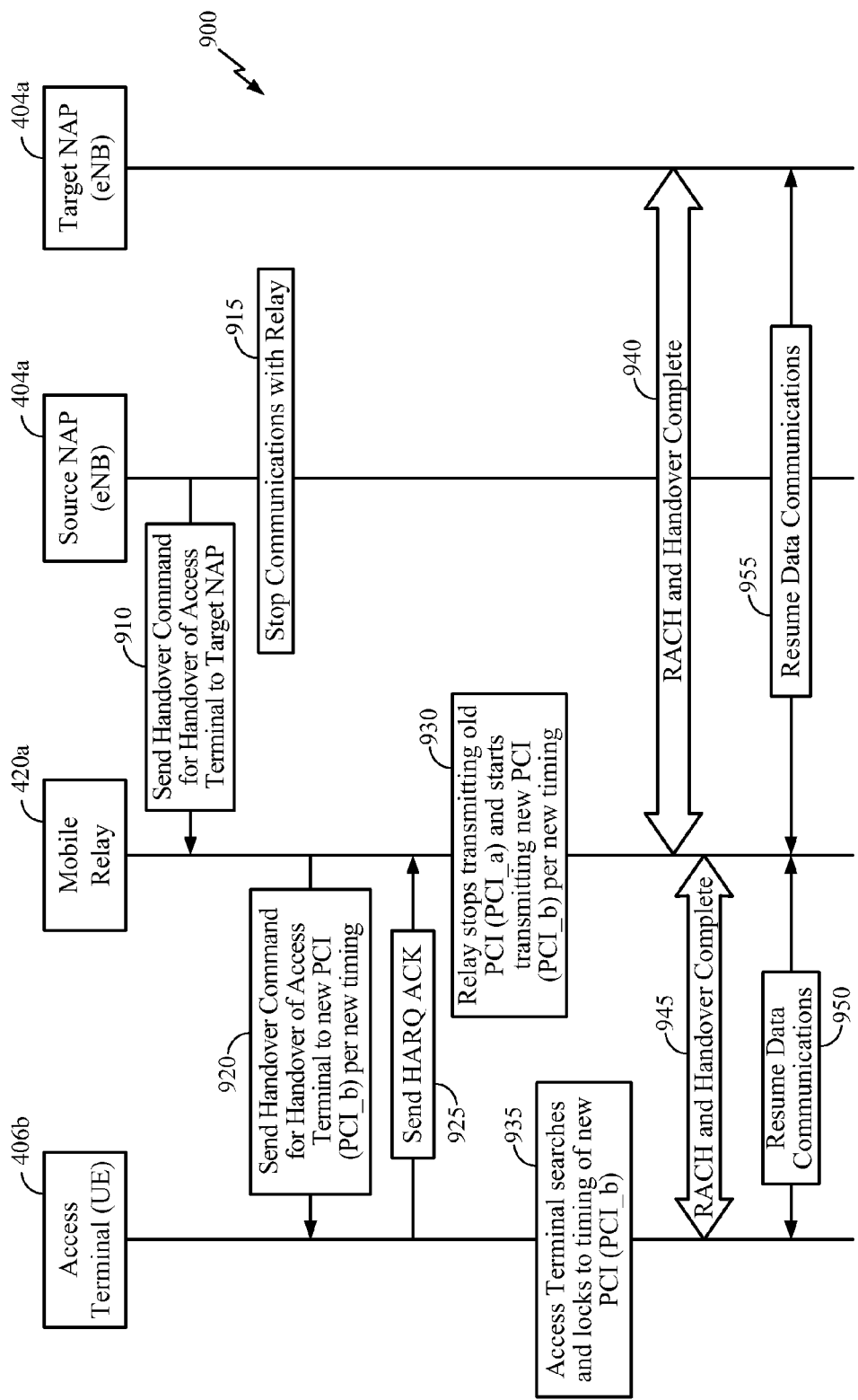
FIG. 9 is a timing diagram illustrating yet another exemplary message exchange among a mobile relay, an access terminal, and source/target network access points in accordance with various exemplary embodiments.

To avoid access terminal RACH on the previous RACH occasion, a new Physical Cell Identifier (PCI) may be used. FIG. 9 is a timing diagram illustrating yet another exemplary message exchange among a mobile relay, an access terminal, and source/target network access points in which the backhaul and access link synchronization timing are sequentially adjusted using a new PCI in accordance with various exemplary embodiments.

Referring to FIG. 9, at block 910, the source eNB 404a may send to the mobile relay 420a a handover command indicating that the mobile relay 420a is to be handed over from the source eNB 404a to the target eNB 404b. At block 915, the source eNB 404a may stop communication (e.g., all communication) with the mobile relay 420a. At block 920, a handover command may be sent by the mobile relay 420a to the access terminal 406b served by the mobile relay 420a. The handover command may inform the access terminal 406b of a time at which the access terminal 406b is to initiate handover to a new macro cell with the PCI of PCI_b. For example, the time may be (1) a delay interval based on when the mobile relay 420a will switch access link synchronization timing; or (2) a time chosen by the mobile relay 420a. That is, the handover command may include a new PCI (i.e., PCI_b) for the handover procedure and may instruct the access terminal 406b to start a RACH procedure to link to the new cell (corresponding to the PCI of (PCI_b)) after the mobile relay access link synchronization timing has been adjusted.

At block 925, the access terminal 406b may send to the mobile relay 420a an acknowledgment (e.g., a HARQ acknowledgement). At block 930, the mobile relay 420a may stop transmitting using the old PCI (i.e., PCI_a) and may start transmitting using the new PCI (PCI-b) with newly adjusted timing by searching for a signal from and locking to the new cell corresponding to the new PCI (PCI_b). At block 935, the access terminal 406b may search for a signal from the new PCI (PCI_b) and may lock timing to such a signal. That is, the access terminal 406b may adjust its synchronization timing to the synchronization timing of the new cell corresponding to the new PCI (PCI_b). At block 940, RACH and handover operations are completed between the mobile relay 420a and the target eNB 404b (which has the new PCI (PCI_b)) and, at block 945, RACH and handover operations are completed between the access terminal 406b and the mobile relay 420a (which now also uses the new PCI (PCI_b)).

At blocks 950 and 955, data communications are resumed between the access terminal 406b and mobile relay 420a and between the mobile relay 420a and target eNB 404b, respectively.

It is contemplated that two sync signals may be simultaneously transmitted with different PCIS and timing and that the timing of the new PCI may be acquired before the mobile relay 420a completes its handover operation.

The timing adjustment procedures described with regard to FIG. 9 may support legacy access terminals, may not use buffer transfers and may perform better than macro network handover operations.

In certain exemplary embodiments, the access terminal may search for Primary Synchronization Signal (PSS) and/or Secondary Synchronization Signal (SSS) to obtain downlink synchronization prior to implementing the access procedure to switch access timing).

Although the blocks in FIG. 9 are shown sequentially, it is contemplated that many of the blocks may be performed concurrently (e.g., in parallel). For example, blocks 915 and 920 may be performed concurrently, blocks 930 and 935 may be performed concurrently and/or blocks 940 and 945 may be performed concurrently.

For example, the mobile relay 420a may send a handover command to the one or more access terminals 406b served by the mobile relay 420a. The handover command may indicate a new PCI (e.g., PCI_b) of a new cell different from a cell serving the one or more access terminals. Each of the one or more access terminals 406b may search for a signal from the new cell corresponding to the new PCI of PCI_b and may determine from the signal the synchronization timing of the new cell such that the synchronization timing of each of the one or more access terminals 406b is locked to the determined synchronization timing.

Although message exchange has been shown for asynchronous networks (i.e., where eNBs operate with different synchronization timings), it is contemplated that the message exchanges may apply to synchronous networks, as well. More particularly, the handover operation to the same cell may be compared to the handover operation to the same cell but with a different carrier. In synchronous networks, upon handover to the new eNB, the mobile relay may have adjusted its timing on both the backhaul downlink and the backhaul uplink to adapt to the new eNB. The adjustments may cause a degree of misalignment between access and backhaul subframes. The mobile relay may, thus, also adjust its access link timing in synchronous network handover operations.

Figure 10:
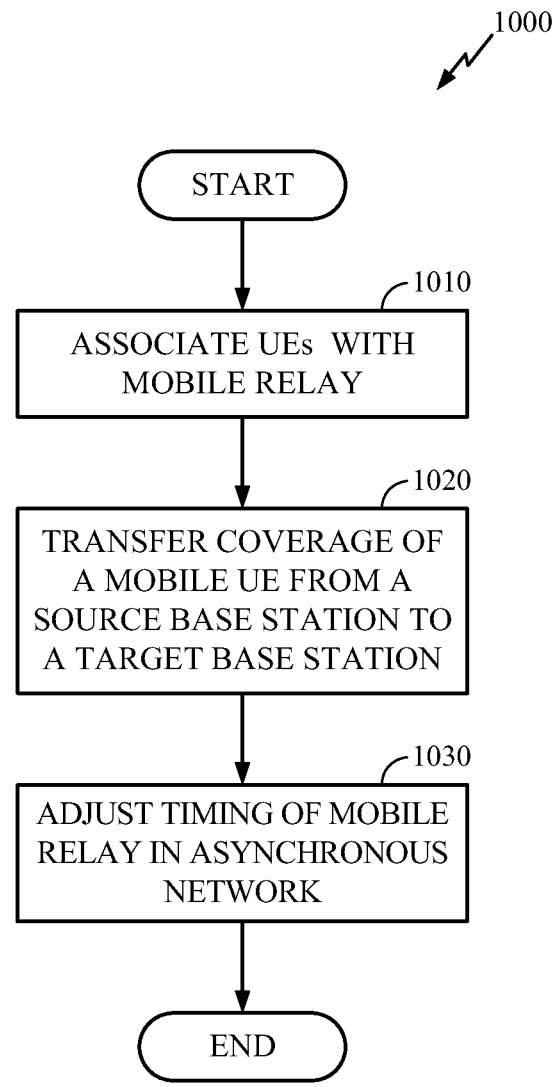
FIG. 10 is a flowchart illustrating an exemplary method of adjusting timing for a mobile relay.

FIG. 10 is a flowchart illustrating an exemplary method 1000 of adjusting timing for a mobile relay 310. Referring to FIG. 10, at block 1010, a plurality of access terminals (e.g., UE 316 and 318) may be associated with (e.g., served by) the mobile relay 310. The mobile relay 310 may be positioned on a mobile platform 320. At block 1020, the mobile relay 310 may be moved such that its positioning/associated coverage area may be transferred from a source eNB 312 to target eNB 314. For example, the repositioning of the coverage of the mobile relay 310 may include moving the mobile relay 310 within a first region associated with the source eNB 312 (the first NAP) and a second region associated with the target eNB 314 (the second NAP).

If the target eNB 314 is asynchronous with respect to the source eNB 312, during the movement (e.g., re-positioning) of the mobile relay 310, and to mitigate the service interruption to connected-state access terminals 316 and 318, the mobile relay 310 may adjust its synchronization timing (e.g., subframe timing) at block 1030. For example, the adjustment of the synchronization timing of the mobile relay 310 may include: (1) receiving, by the mobile relay 310, a signal indicating a synchronization timing associated with the second NAP (eNB 314), and (2) adjusting the synchronization timing of the mobile relay 310 in accordance with the synchronization timing associated with the second NAP 314.

In certain exemplary embodiments, logical channels may be classified into Control Channels and Traffic Channels. Logical Control Channels may comprise: (1) a Broadcast Control Channel (BCCH), which is DL channel for broadcasting system control information; (2) a Paging Control Channel (PCCH), which is DL channel that transfers paging information; and/or (3) a Multicast Control Channel (MCCH), which is Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection this channel may be used by the access terminals (UEs) that receive MBMS (including for example, MCCH and MBMS control channel (MSCH)).

Dedicated Control Channel (DCCH) is Point-to-point bi-directional channel that transmits dedicated control information and may be used by the access terminals (UEs) having an RRC connection. In certain exemplary embodiments, Logical Traffic Channels may comprise a Dedicated Traffic Channel (DTCH), which is Point-to-point bi-directional channel, dedicated to one access terminal (UE), for the transfer of user information or a Multicast Traffic Channel MTCH for Point-to-multipoint downlink channel for transmitting traffic data.

In various exemplary embodiments, Transport Channels may be classified into downlink (DL) and uplink (UL). DL Transport Channels may comprise a Broadcast Channel (BCH), Downlink Shared Data Channel (DL-SDCH) and/or a Paging Channel (PCH). The PCH may support access terminal power saving (DRX cycle as indicated by the network to the access terminal), may be broadcasted over an entire cell and may be mapped to PHY resources, which may be used for other control/traffic channels. The UL Transport Channels may comprise a Random Access Channel (RACH), a Request Channel (REQCH), an Uplink Shared Data Channel (UL-SDCH) and a plurality of PHY channels. The PHY channels may comprise a set of DL channels and UL channels.

The DL PHY channels may comprise: (1) a Common Pilot Channel (CPICH); (2) a Synchronization Channel (SCH); (3) a Common Control Channel (CCCH); (4) a Shared DL Control Channel (SDCCH); (5) a Multicast Control Channel (MCCH); (6) a Shared UL Assignment Channel (SUACH); (7) an Acknowledgement Channel (ACKCH); (8) a DL Physical Shared Data Channel (DL-PSDCH); (9) a UL Power Control Channel (UPCCH); (10) a Paging Indicator Channel (PICH); and/or (11) a Load Indicator Channel (LICH). The UL PHY Channels may comprises: (1) a Physical Random Access Channel (PRACH); (2) a Channel Quality Indicator Channel (CQICH); (3) an Acknowledgement Channel (ACKCH); (4) an Antenna Subset Indicator Channel (ASICH); (5) a Shared Request Channel (SREQCH); (6) a UL Physical Shared Data Channel (UL-PSDCH) and/or (7) a Broadband Pilot Channel (BPICH).

In various exemplary embodiments, a channel structure may be provided that preserves low Peak to Average Power Ratio (PAPR) at any given time. The channel may be contiguous or uniformly spaced in frequency properties of a single carrier waveform.

It is understood by one skilled in the art that the specific order or hierarchy of steps in the timing adjustment procedure disclosed is an example of exemplary approaches. Based upon design preferences, it is understood that the specific order or hierarchy of steps may be rearranged while remaining within the scope of the present disclosure. The accompanying method claims present elements of the various steps in a sample order, and are not meant to be limited to the specific order or hierarchy presented.

Those skilled in the art understand that information and signals may be represented using any of a variety of different technologies and techniques. For example, data, instructions, commands, information, signals, bits, symbols, and/or chips that may be referenced throughout the above description may be represented by voltages, currents, electromagnetic waves, magnetic fields or particles, optical fields or particles, or any combination thereof. Those of skill in the art would further appreciate that the various illustrative logical blocks, modules, circuits, and algorithm steps described in connection with the exemplary embodiments disclosed herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters and/or data, among others, may be passed, forwarded or transmitted using any suitable means including memory sharing, message passing, token passing, and/or network transmission, among others.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case the memory unit may be communicatively coupled to the processor via various means as is known in the art.

What is claimed is:

1. A method used in a wireless communication system for managing an adjustment of synchronization timing for handover of a mobile relay, the method comprising:

repositioning coverage of the mobile relay from a first network access point to a second network access point; and adjusting synchronization timing of the mobile relay in an asynchronous network of the wireless communication system comprising receiving, by the mobile relay, a signal indicating a different synchronization timing associated with the second network access point, the different synchronization timing being different from a current synchronization timing associated with the first network access point and adjusting the synchronization timing of the mobile relay in accordance with the different synchronization timing, wherein the adjusting of the synchronization timing of the mobile relay includes determining, by the mobile relay, whether a handover operation is to be initiated for handover of the mobile relay from the first network access point to the second network access point, and wherein the adjusting includes concurrently adjusting synchronization timing of the backhaul and access links of the mobile relay exclusive of any notification to the one or more access terminals served by the mobile relay that the synchronization timing of the access links are being adjusted; and wirelessly relaying, by the mobile relay, communications between or among: (1) the first network access point and one or more access terminals prior to the adjusting of the synchronization timing; and (2) the second network access point and the one or more access terminals subsequent to the adjusting of the synchronization timing, wherein the wireless relaying of communications includes communicating, by the mobile relay, with the first or second network access point using one or more backhaul links and with each of the one or more access terminals using one or more access links, and concurrently adjusting the synchronization timing associated with the backhaul and access links of the mobile relay.

2. The method of claim 1, wherein the determining, by the mobile relay, whether a handover operation is to be initiated for the handover of the mobile relay from the first network access point to the second network access point includes detecting, by the mobile relay, one of:
   (1) a signal level from the second network access point; or
   (2) a handover instruction from the first network access point instructing the mobile relay to initiate the handover operation; and
   handing over, from the first network access point to the second network access point, the mobile relay based on the determined result.

3. The method of claim 1, wherein;
   the repositioning of the coverage of the mobile relay includes moving the mobile relay within a first region associated with the first network access point and a second region associated with the second network access point; and
   the adjusting of the synchronization timing of the mobile relay includes changing the synchronization timing of the mobile relay to the different synchronization timing, the method further comprising:
   transferring communications from between or among the first network access point and one or more access terminals to between or among the second network access point and the one or more access terminals.

4. The method of claim 1, further comprising:
   broadcasting, by the mobile relay, synchronization information indicating the different synchronization timing and service interruption information, the service interruption information defining a service interruption interval for handover of the mobile relay to the second network access point, wherein the adjusting of the synchronization timing of the mobile relay occurs prior to an end of the service interruption interval; and
   adjusting, after the service interruption interval, the synchronization timing of the one or more access terminals in accordance with the different synchronization timing in the synchronization information.

5. The method of claim 1, further comprising sending, from the mobile relay, a handover command to one or more access terminals served by the mobile relay, responsive to initiating a handover operation.

6. The method of claim 5, further comprising:
   during the handover operation, establishing a link between each of the one or more access terminals and the second network access point by:
   (1) sending random access channel occasion information in the handover command, and
   (2) acquiring, by each of the one or more access terminals served by the mobile relay, the different synchronization timing of the second network access point using the random access channel occasion information included in the handover command; and
   establishing a further link between the mobile relay and the second network access point.

7. The method of claim 1, wherein the adjusting of the synchronization timing includes:
   determining from the received signal the synchronization timing associated with the second network access point; and
   locking the synchronization timing of the mobile relay to the determined synchronization timing.

8. The method of claim 1, further comprising:
   sending, from the mobile relay, a handover command to the one or more access terminals served by the mobile relay, the handover command indicating a new physical cell identifier of a new cell different from a cell serving the one or more access terminals;
   searching, by each of the one or more access terminals, for a signal from the new cell corresponding to the new physical cell identifier;
   determining, by the one or more access terminals, from the signal the synchronization timing of the new cell corresponding to the new physical cell identifier; and
   locking the synchronization timing of each of the one or more access terminals to the determined synchronization timing.

9. A method used in a wireless communication system for managing an adjustment of synchronization timing for handover of a mobile relay, the method comprising:
   repositioning coverage of the mobile relay from a first network access point to a second network access point;
   adjusting synchronization timing of the mobile relay in an asynchronous network of the wireless communication system by receiving, by the mobile relay, a signal indicating a different synchronization timing associated with the second network access point, the different synchronization timing being different from a current synchronization timing associated with the first network access point, and adjusting the synchronization timing of the mobile relay in accordance with the different synchronization timing;
   sending, from the mobile relay, a handover command to one or more access terminals served by the mobile relay, responsive to initiating a handover operation, and during the handover operation, establishing a link between each of the one or more access terminals and the second network access point by:
   (1) sending random access channel occasion information in the handover command, and
   (2) acquiring, by each of the one or more access terminals served by the mobile relay, the different synchronization timing of the second network access point using the random access channel occasion information included in the handover command; and
   establishing a further link between the mobile relay and the second network access point, and;
   wherein responsive to the establishing of the further link:
   sending, by the second network access point, a further handover command to the one or more access terminals, and
   establishing another link between each of the one or more access terminals and the mobile relay by handing over the one or more access terminals from the second network access point to the mobile relay.

10. A method used in a wireless communication system for managing an adjustment of synchronization timing for handover of a mobile relay, the method comprising:
   repositioning coverage of the mobile relay from a first network access point to a second network access point; and adjusting synchronization timing of the mobile relay in an asynchronous network of the wireless communication system by receiving, by the mobile relay, a signal indicating a different synchronization timing associated with the second network access point, the different synchronization timing being different from a current synchronization timing associated with the first network access point and adjusting the synchronization timing of the mobile relay in accordance with the different synchronization timing; and wirelessly relaying, by the mobile relay, communications between or among: (1) the first network access point and one or more access terminals prior to the adjusting of the synchronization timing; and (2) the second network access point and the one or more access terminals subsequent to the adjusting of the synchronization timing, wherein the wireless relaying of communications includes communicating, by the mobile relay, with the first or second network access point using one or more backhaul links and with each of the one or more access terminals using one or more access links, and concurrently adjusting the synchronization timing associated with the backhaul and access links of the mobile relay, wherein the mobile relay, the one or more access terminals and the first and second network access points communicate via a wireless network, the method further comprising reestablishing, by each of the one or more access terminals, a link to the wireless communication system responsive to a radio link failure.

11. A method used in a wireless communication system for managing an adjustment of synchronization timing for handover of a mobile relay, the method comprising:

repositioning coverage of the mobile relay from a first network access point to a second network access point;

adjusting synchronization timing of the mobile relay in an asynchronous network of the wireless communication system by receiving, by the mobile relay, a signal indicating a different synchronization timing associated with the second network access point, the different synchronization timing being different from a current synchronization timing associated with the first network access point and adjusting the synchronization timing of the mobile relay in accordance with the different synchronization timing;

wirelessly relaying, by the mobile relay, communications between or among: (1) the first network access point and one or more access terminals prior to the adjusting of the synchronization timing; and (2) the second network access point and the one or more access terminals subsequent to the adjusting of the synchronization timing, wherein the wireless relaying of communications includes communicating, by the mobile relay, with the first or second network access point using one or more backhaul links and with each of the one or more access terminals using one or more access links, and concurrently adjusting the synchronization timing associated with the backhaul and access links of the mobile relay; and prior to initiating a handover operation, sending, by the mobile relay, a command to adjust a radio link failure interval.

12. A method used in a wireless communication system for managing an adjustment of synchronization timing for handover of a mobile relay, the method comprising:

repositioning coverage of the mobile relay from a first network access point to a second network access point;

adjusting synchronization timing of the mobile relay in an asynchronous network of the wireless communication system by receiving, by the mobile relay, a signal indicating a different synchronization timing associated with the second network access point, the different synchronization timing being different from a current synchronization timing associated with the first network access point and adjusting the synchronization timing of the mobile relay in accordance with the different synchronization timing; and wirelessly relaying, by the mobile relay, communications between or among: (1) the first network access point and one or more access terminals prior to the adjusting of the synchronization timing; and (2) the second network access point and the one or more access terminals subsequent to the adjusting of the synchronization timing, wherein the wirelessly relaying of communications includes:

communicating, by the mobile relay, with the first or second network access point using one or more backhaul links and with each of one or more access terminals using one or more access links; and adjusting the synchronization timing associated with the backhaul links, exclusive of any adjustment of the synchronization timing associated with the access links.

13. The method of claim 12, further comprising establishing a plurality of contiguous subframes used for each of the backhaul links.

14. A method used in a wireless communication system for managing an adjustment of synchronization timing for handover of a mobile relay, the method comprising:

repositioning coverage of the mobile relay from a first network access point to a second network access point;

adjusting synchronization timing of the mobile relay in an asynchronous network of the wireless communication system; and communicating, by the mobile relay, with the first or second network access point using one or more backhaul links and with each of one or more access terminals using one or more access links, wherein the adjusting of the synchronization timing of the relay includes:

adjusting a synchronization timing associated with the backhaul links, and transitioning a synchronization timing of the access links, by the mobile relay, from the current synchronization timing to the different synchronization timing during a transition period responsive to the synchronization timing associated with the backhaul links of the mobile relay being adjusted to the different synchronization timing, wherein the transitioning of the synchronization timing of the access links includes sending, during the transition period, a handover command to the one or more access terminals indicating that the one or more access terminals are to be handed over to the mobile relay at a predetermined time.

15. A method used in a wireless communication system for managing an adjustment of synchronization timing for handover of a mobile relay, the method comprising:

repositioning coverage of the mobile relay from a first network access point to a second network access point;

adjusting synchronization timing of the mobile relay in an asynchronous network of the wireless communication system; and communicating, by the mobile relay, with the first or second network access point using one or more backhaul links and with each of one or more access terminals using one or more access links, wherein the adjusting of the synchronization timing of the relay includes:
adjusting a synchronization timing associated with the backhaul links, and
transitioning a synchronization timing of the access links, by the mobile relay, from the current synchronization timing to the different synchronization timing during a transition period responsive to the synchronization timing associated with the backhaul links of the mobile relay being adjusted to the different synchronization timing, wherein the transitioning of the synchronization timing of the access links includes adjusting the synchronization timing of the access links at a rate sufficiently slow to maintain communications between the mobile relay and the access terminals during the transition period.

16. A method used in a wireless communication system for managing an adjustment of synchronization timing for handover of a mobile relay, the method comprising:
repositioning coverage of the mobile relay from a first network access point to a second network access point;
adjusting synchronization timing of the mobile relay in an asynchronous network of the wireless communication system; and
communicating, by the mobile relay, with the first or second network access point using one or more backhaul links and with each of one or more access terminals using one or more access links, wherein the adjusting of the synchronization timing of the relay includes:
adjusting a synchronization timing associated with the backhaul links, and
transitioning a synchronization timing of the access links, by the mobile relay, from the current synchronization timing to the different synchronization timing during a transition period responsive to the synchronization timing associated with the backhaul links of the mobile relay being adjusted to the different synchronization timing, and further comprising:
determining, by the mobile relay, a sequential order for each of the one or more access terminals to be handed over to the mobile relay; and
initiating, by the mobile relay, a random access procedure to handover each of the one or more access terminals after a predetermined time in the determined sequential order.

17. A mobile relay operable in a wireless communication system, comprising:
a processor for repositioning coverage of the mobile relay from a source base station to a target base station and adjusting timing of the mobile relay in an asynchronous network of the wireless communication system, wherein the processor determines whether to initiate a handover operation to handover the mobile relay from the source base station to the target base station, wherein the processor receives a signal indicating a synchronization timing of the target base station, which is different from a current synchronization timing of the mobile relay, and controls an adjustment of the synchronization timing of the mobile relay based on the synchronization timing indicated in the received signal,
a transmitter for externally communicating information synchronized to the synchronization timing indicated in the received signal,
wherein the mobile relay communicates with the source base station or target base station using one or more backhaul links, communicates with one or more access terminals using one or more access links, and adjusts the synchronization timing associated with the backhaul links exclusive of any adjustment of the synchronization timing of the access links; and
a memory coupled to the processor for storing data.

18. The mobile relay of claim 17, wherein the mobile relay is moveable between a first region of the wireless communication system corresponding to the source base station and a second region of the wireless communication system corresponding to the target base station.

19. The mobile relay of claim 17, wherein the processor determines whether to initiate a handover operation based on detecting one of:
(1) a signal from the target base station; or
(2) an instruction from the source base station.

20. The mobile relay of claim 17, wherein the mobile relay concurrently adjusts the synchronization timing associated with the backhaul links and the access links.

21. A mobile relay operable in a wireless communication system, comprising:
a processor for repositioning coverage of the mobile relay from a source base station to a target base station and adjusting timing of the mobile relay in an asynchronous network of the wireless communication system, wherein the processor determines whether to initiate a handover operation to handover the mobile relay from the source base station to the target base station, and wherein the processor receives a signal indicating a synchronization timing of the target base station, which is different from a current synchronization timing of the mobile relay, and controls an adjustment of the synchronization timing of the mobile relay based on the synchronization timing indicated in the received signal, wherein prior to initiating the handover operation, the processor controls transmission of a command to the one or more access terminals for adjusting a radio link failure interval;
a transmitter for externally communicating information synchronized to the synchronization timing indicated in the received signal, and
a memory coupled to the processor for storing data.

22. The mobile relay of claim 21, wherein responsive to initiating the handover operation, (1) the mobile relay broadcasts synchronization information indicating the synchronization timing of the target base station and service interruption information defining a service interrupt interval for handover of the mobile relay to the target base station and (2) the processor controls the adjustment of the timing of the mobile relay for completion during the service interruption interval.

23. An apparatus operable in an asynchronous wireless network system, the apparatus comprising:
means for repositioning coverage of the apparatus from a source base station to a target base station;
means for adjusting timing of the apparatus in the asynchronous wireless network; and
means communicating with the first or second network access point using one or more backhaul links and with each of one or more access terminals using one or more access links, wherein the means for adjusting of the synchronization timing of the relay includes:
means for adjusting a synchronization timing associated with the backhaul links, and
means for transitioning a synchronization timing of the access links from the current synchronization timing to the different synchronization timing during a transition period responsive to the synchronization timing associated with the backhaul links of the apparatus being adjusted to the different synchronization timing, wherein the transitioning of the synchronization timing of the access links includes sending, during the transition period, a handover command to the one or more access terminals indicating that the one or more access terminals are to be handed over to the apparatus at a predetermined time.

24. A wireless network including a first network access point and one or more access terminals, comprising:
a mobile relay operable to wirelessly relay communications between the first network access point and the one or more access terminals, the mobile relay having a current synchronization timing associated with the first network access point; and
a second network access point that transmits a message indicating a different synchronization timing associated with the second network access point, the different synchronization timing being different from the current synchronization timing, wherein
the mobile relay determines that communications are to be transferred from between the first network access point and the one or more access terminals to between the second network access point and the one or more access terminals, and adjusts the synchronization timing of mobile relay in accordance with the different synchronization timing to transfer communications,
wherein the mobile relay communicates with the first or second network access point using one or more backhaul links and communicates with each of the one or more access terminals using one or more access links and the mobile relay adjusts synchronization timing of the backhaul link in accordance with the different synchronization timing and maintains the current synchronization timing for the access links.

25. A computer program product, comprising:
a non-transitory computer-readable medium comprising code for:
wirelessly relaying communications between a first network access point and at least one access terminal;
receiving synchronization information indicating a different synchronization timing associated with a second network access point, the different synchronization timing being different from the current synchronization timing of a mobile relay;
determining whether a handover operation is to be initiated by the mobile relay for handover of the mobile relay from the first network access point to the second network access point;
adjusting the synchronization timing of the mobile relay in accordance with the different synchronization timing, and
communicating with the first or second network access point using one or more backhaul links, communicating with the at least one access terminal using one or more access links, and the mobile relay adjusting synchronization timing of the backhaul link in accordance with the different synchronization timing and maintaining the current synchronization timing for the access links.

26. A computer program product, comprising:
a non-transitory computer-readable medium comprising code for:
repositioning coverage of a mobile relay from a source base station to a target base station;
determining whether a handover operation is to be initiated by the mobile relay for handover of the mobile relay from the first network access point to the second network access point; and
adjusting time of the mobile relay in an asynchronous network,
wherein the mobile relay communicates with the first or second network access point using one or more backhaul links and communicates with each of the one or more access terminals using one or more access links and the mobile relay adjusts synchronization timing of the backhaul link in accordance with the different synchronization timing and maintains the current synchronization timing for the access links.

* * * * *